(12) United States Patent
Belleschi et al.

(10) Patent No.: US 11,375,510 B2
(45) Date of Patent: Jun. 28, 2022

(54) METHODS TO ENABLE SIDELINK MULTICARRIER TRANSMISSIONS

(71) Applicant: TELEFONAKTIEBOLAGET LM ERICSSON (PUBL), Stockholm (SE)

(72) Inventors: Marco Belleschi, Solna (SE); Ricardo Blasco Serrano, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 55 days.

(21) Appl. No.: 16/650,801

(22) PCT Filed: Sep. 27, 2018

(86) PCT No.: PCT/IB2018/057509
§ 371 (c)(1),
(2) Date: Mar. 25, 2020

(87) PCT Pub. No.: WO2019/064228
PCT Pub. Date: Apr. 4, 2019

(65) Prior Publication Data
US 2020/0229194 A1    Jul. 16, 2020

Related U.S. Application Data

(60) Provisional application No. 62/563,747, filed on Sep. 27, 2017.

(51) Int. Cl.
*H04W 72/04* (2009.01)
*H04L 5/00* (2006.01)
*H04W 92/18* (2009.01)

(52) U.S. Cl.
CPC ....... *H04W 72/0486* (2013.01); *H04L 5/0064* (2013.01); *H04W 72/0453* (2013.01); *H04W 92/18* (2013.01)

(58) Field of Classification Search
None
See application file for complete search history.

(56) References Cited

U.S. PATENT DOCUMENTS

2016/0150520 A1* 5/2016 Fodor .................. H04L 47/745
                                                                455/426.1
2018/0048433 A1* 2/2018 Martin ...................... H04L 1/22
2018/0124771 A1* 5/2018 Mok ................. H04W 36/0072
(Continued)

OTHER PUBLICATIONS

3GPP TSG RAN WG1, Meeting #90bis: "Sidelink Carrier Aggregation for Mode-4 LTE V2V Communication"; Prague, Czech Republic; Oct. 9-13, 2017; R1-1717330; 8 pages.
(Continued)

*Primary Examiner* — Nicholas Sloms
(74) *Attorney, Agent, or Firm* — Ericsson Inc.

(57) ABSTRACT

There is provided a method in a wireless device for transmitting data on sidelink carriers. The method comprises: obtaining a threshold related to a data rate; determining one or more sidelink carriers based on the threshold; selecting one or more sidelink carriers from the determined one or more sidelinks carriers for data transmission; transmitting data using the one or more selected sidelink carriers. The data rate may correspond to a buffer status of the wireless device, a bit rate or a congestion measurement of the sidelink carriers. A wireless device for performing this method is also provided.

18 Claims, 14 Drawing Sheets

(56) References Cited

U.S. PATENT DOCUMENTS

| | | | | |
|---|---|---|---|---|
| 2018/0227971 A1* | 8/2018 | Yasukawa | .............. | H04W 72/04 |
| 2018/0234889 A1* | 8/2018 | Baghel | .................. | H04W 24/08 |
| 2018/0254820 A1* | 9/2018 | Chae | ........................ | H04W 4/46 |
| 2019/0090250 A1* | 3/2019 | Lee | .................... | H04W 72/0446 |
| 2019/0200366 A1* | 6/2019 | Park | .................... | H04W 72/0486 |
| 2019/0208441 A1* | 7/2019 | Wang | .................... | H04B 17/318 |
| 2019/0394665 A1* | 12/2019 | Kim | ........................ | H04W 24/10 |
| 2019/0394786 A1* | 12/2019 | Parron | ................. | H04L 27/0006 |
| 2020/0008030 A1* | 1/2020 | Kim | ........................ | H04L 5/003 |
| 2020/0015298 A1* | 1/2020 | Chae | ................. | H04W 72/0486 |
| 2020/0068593 A1* | 2/2020 | Seo | .................... | H04W 72/1247 |
| 2020/0107330 A1* | 4/2020 | Chae | ................... | H04W 72/085 |
| 2020/0146040 A1* | 5/2020 | Lee | .................... | H04W 72/1242 |
| 2020/0221335 A1* | 7/2020 | Chae | ...................... | H04W 76/14 |
| 2020/0314803 A1* | 10/2020 | Zhang | ................. | H04W 74/006 |
| 2021/0314796 A1* | 10/2021 | Hoang | ................. | H04W 72/02 |

OTHER PUBLICATIONS

3GPP TSG RAN WG1, Meeting #90: "Sidelink Carrier Aggregation for Mode-4 LTE V2V Communication"; Prague, Czech Republic; Aug. 21-25, 2017; R1-1712481; 8 pages.

3GPP TSG RAN WG1, Meeting #91: "Physical Layer Aspects of Sidelink Carrier Aggregation for Mode-4 LTE V2V Communication"; Reno, USA, Nov. 27-Dec. 1, 2017; R1-1720031; 8 pages.

3GPP TSG RAN WG1, Meeting #87: "Discussion on UE behavior in congestion control"; Reno, USA; Nov. 14-18, 2016; R1-1611741; 4 pages.

3GPP TSG-RAN WG2, Meeting #102: "Introduction of eV2X in TS 36.300"; Busan, Korea; May 21-25, 2018; R2-1808922; 14 pages.

International Search Report and Written Opinion of PCT application No. PCT/IB2018/057509; dated Mar. 25, 2019; 14 pages.

Ericsson, "Sidelink Carrier Selection Criteria", 3GPP TSG-RAN WG2 #99bis, Tdoc R2-1711493, Prague, Czech Republic, Oct. 9-13, 2017.

* cited by examiner

METHODS TO ENABLE SIDELINK MULTICARRIER TRANSMISSIONS

RELATED APPLICATIONS

The present application claims the benefits of priority of U.S. Provisional Patent Application No. 62/563,747, entitled "Methods to enable sidelink multicarrier transmissions", and filed at the United States Patent and Trademark Office on Sep. 27, 2018, the content of which is incorporated herein by reference.

TECHNICAL FIELD

The present description generally relates to wireless communication systems and more specifically to transmissions in device to device (D2D) environments.

BACKGROUND

Sidelink Evolution in 3GPP

During Release 12 (Rel-12), the Long Term Evolution (LTE) standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices. In Third Generation Partnership Project (3GPP), all of these applications are defined under the umbrella of Proximity Services (ProSe).

One of the potential extensions of the ProSe framework consists of support of V2X communication, which includes any combination of direct communication between vehicles, pedestrians, and infrastructure. V2X communication may take advantage of a NetWork (NW) infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure (e.g. Vehicle to Infrastructure (V2I)) and Vehicle to Pedestrian (V2P) and Vehicle to Vehicle (V2V) communications, as compared to using a dedicated V2X technology.

There are many research projects and field tests of connected vehicles in various countries or regions, including projects that are based on the use of existing cellular infrastructure.

V2X communications may carry both non-safety and safety information, where each of the applications and services may be associated with specific requirements sets, e.g., in terms of latency, reliability, capacity, etc. From the application point of view, V2X includes the following types of V2X communications/services as illustrated in FIG. 1: Vehicle to Vehicle (V2V) 110, Vehicle to Infrastructure (V2I) 120, Vehicle to Pedestrian (V2P) 130 and Vehicle to Network (V2N) 140.

For example, the V2V 110 communication covers a communication between vehicles using V2V applications and is predominantly broadcast-based. V2V 110 may be realized by either direct communication between the devices in the respective vehicles, or via infrastructure such as a cellular network. An example of V2V 110 is the transmission of a cooperative awareness message (CAM) with vehicle status information (such as position, direction, and speed) transmitted to other vehicles in the proximity repeatedly (every 100 ms-1 s). Another example is the transmission of a decentralized environmental notification message (DENM), which is an event-triggered message to alert vehicles. These two examples are taken from the European Telecommunications Standards Institute (ETSI) Intelligent Transport Systems (ITS) specification of V2X applications, which also specifies the conditions under which the messages are generated. Main characteristic of V2V applications is the tight requirements on latency that can vary from 20 ms (for pre-crash warning messages) to 100 ms for other road safety services.

V2I 120 communication comprises communication between vehicles and a Roadside Unit (RSU). The RSU is a stationary transportation infrastructure entity which communicates with vehicles in its proximity. An example of V2I is transmission of speed notifications from the RSU to vehicles, as well as queue information, collision risk alerts, curve speed warnings. Due to the safety related nature of V2I, delay requirements are similar to V2V requirements.

V2P 130 communication covers a communication between vehicles and vulnerable road users, such as pedestrians, using V2P applications. V2P 130 typically takes place between distinct vehicles and pedestrians either directly or via infrastructure such as the cellular network.

V2N 140 communication covers a communication between a vehicle and a centralized application server (or an ITS Traffic Management Center) both using V2N applications, via infrastructure (such as a cellular network). One example is a bad road condition warning sent to all vehicles in a wide area, or traffic flow optimization in which V2N application suggests speeds to vehicles and coordinates traffic lights. Therefore, V2N messages are supposed to be controlled by a centralized entity (i.e. the Traffic Management Center) and provisioned to vehicles in a large geographical area, rather than in a small area.

Sidelink Operations

As previously mentioned Sidelink transmissions (also known as D2D or ProSe) over the so-called PC5 interface in cellular spectrum have been standardized in 3GPP since Rel-12. PC5 is the definition used in 3GPP to identify the radio interface, i.e. the sidelink, used for any D2D communication, such as ProSe communications, ProSe discovery and V2X. In 3GPP Rel-12, two different transmission modes have been specified in 3GPP. In one mode (mode-1), a User Equipment (UE) in RRC_CONNECTED mode requests D2D resources and the network node (e.g. eNB) grants them via Physical Downlink Control Channel (PDCCH), with Downlink Control Information (DCI) such as DCI5, or via dedicated signalling. In the second mode (mode-2), a UE autonomously selects resources for transmission from a pool of available resources that the eNB provides in broadcast via System Information Block (SIB) signalling for transmissions on carriers other than the Primary cell (PCell) or via dedicated signaling for transmissions on the PCell. Therefore, unlike the first operation mode, the second operation mode can be performed also by UEs in RRC_IDLE mode and in some cases even by UEs out of coverage.

In Rel-14, the usage of sidelink is extended to the V2X domain. The original design of the sidelink physical layer in Rel-12 targeted a scenario with a small number of UEs competing for the same physical resources in the spectrum, to carry voice packets for Mission Critical Push To Talk (MCPTT) traffic, and assumed low UE mobility. However, in V2X, the sidelink should be able to cope with higher load scenario (i.e., hundreds of cars potentially contending for physical resources), to carry time/event triggered V2X messages (CAM, DNEM), and with high UE mobility. For such reasons, 3GPP has discussed possible enhancements to the sidelink physical layer.

A first enhancement that has been specified in Rel-14 is the introduction of a new transmission mode, i.e. mode-3, which resembles mode-1 in the sense that it is the eNB that explicitly assigns sidelink resources to the UE. However, unlike mode-1, the eNB has the possibility to configure the sidelink resources semi-persistently in a SPS-like fashion, i.e. the eNB assigns a sidelink grant for periodic transmissions on a certain frequency resource.

A second enhancement is the introduction of the so-called channel sensing and sensing-aware UE autonomous resource allocation, which corresponds to mode-4 transmission mode. Unlike random resource selection which is the base for Rel-12 and Rel-13 ProSe communications, in V2V (Rel-14) UEs are expected to continuously sense the channel and search for resources in the different parts of the spectrum that are less interfered. Such sensing has the objective to limit collisions between UEs. This second enhancement also introduced a resource reservation procedure which allows a UE to reserve a certain number of transmitting resources for sidelink transmissions on different Time Transmission Intervals (TTIs). In particular, at the beginning of the resource selection procedure, a transmitting counter is initialized. Such counter is stepped whenever a sidelink transmission is performed. When the counter reaches 0, the UE performs a new resource reselection procedure. Resource reselection can also be performed if certain events occur, e.g. if an urgent packet needs to be transmitted and the previously reserved resources do not allow to fulfill the latency requirement of the packet, or if a certain number of reserved resources are left unused.

For the future, it is foreseen that new and more advanced V2X services are expected to be defined, as such, there is a need for improved communications and transmissions in V2X systems.

SUMMARY

Future Sidelink Enhancements

New and more advanced V2X services are expected to proliferate in the next years especially in the context of New Radio (NR) but also in LTE. Such new use cases can be categorized into four use case groups: vehicles platooning, extended sensors, advanced driving and remote driving. For these advanced applications, the expected requirements to meet the needed data rate, reliability, latency, communication range and speed are made more stringent.

To support at least some of these advanced V2X services in LTE, a new work item on 3GPP V2X Phase 2 has started. The work item will specify solutions for the following PC5 functionalities:

Carrier aggregation (up to 8 PC5 carriers);
High order modulation, i.e. 64 Quadrature Amplitude Modulation (QAM);
Reduce the maximum time between packet arrival at Layer 1 and resource selected for transmission;
Radio resource pool sharing between UEs using mode 3 and UEs using mode 4;

Among the possible enhancements, the introduction of sidelink carrier aggregation is expected to give significant gains in terms of capacity, and data rate boosting, and ultimately to serve more service types not necessarily related to ITS safety, e.g. infotainment. However, such feature is also expected to bring significant complexity both in Radio Access Network (RAN) specification work and RAN nodes complexity.

There currently exist certain challenge(s).

For UE autonomous scheduling (i.e. mode-1 or mode-3) there is currently no rule in 3GPP specifications regarding which rules or methods the UE should follow in order to select a carrier. If the selection of the sidelink carriers is left to the UE implementation, several problems may arise. For example, the UE may select a carrier which is highly congested, or it may select a carrier even if the UE does not need it, e.g. only low data rate required, thereby leading to scattered transmissions on multiple sidelink carriers. In general, this would lead to unfair usage of the available spectrum, because performance of UEs which are not capable of transmitting multiple sidelink carriers, might be negatively impacted by other UEs which can transmit on multiple sidelink carriers.

Some possible methods to overcome the above challenges include the following:

The UE can select an additional carrier, when the congestion busy ratio (CBR) of the sidelink carrier is above certain thresholds;
The UE can select an additional carrier when the sidelink packet priority, also called PPPP, is higher than a certain value;
The UE should select a carrier on the basis of the data rate required by the UE;
The set of carriers among which the UE can select a transmitting carrier should be the set of carriers dedicated to the specific service the UE wants to transmit; etc.

All the above methods can be useful to determine which sidelink carrier or set of sidelink carriers the UE should select for sidelink operations, however it is not straightforward how the above methods work together, and how possible different signaling mechanisms could be designed.

Certain aspects of the present disclosure and their embodiments may provide solutions to these or other challenges. This disclosure describes different signaling methods which configure a UE with a set of rules to determine which sidelink carrier to select among the available set of sidelink carriers. For example, a set of methods to configure sidelink carriers for transmission of data having certain traffic identifiers, while ensuring fair usage of the available spectrum and limited UE battery consumption, are disclosed.

According to one aspect, some embodiments include a method performed by a wireless device for data transmissions on sidelink carriers. The method generally comprises: obtaining a threshold related to a data rate; determining one or more sidelink carriers based on the threshold; selecting one or more sidelink carriers from the determined one or more sidelinks carriers for data transmission; transmitting data using the one or more selected sidelink carriers.

In some embodiments, the data rate is based on a buffer status of the wireless device. In some embodiments, the data rate comprises a bit rate. In some embodiments, the data rate the data rate comprises a congestion measurement of the sidelink carriers.

According to a second aspect, some embodiments include a wireless device configured, or operable, to perform one or more functionalities (e.g. actions, operations, steps, etc.) as described herein.

In some embodiments, the wireless device may comprise one or more communication interfaces configured to communicate with one or more other radio nodes, wireless devices and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the wireless device may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the wireless device, configure the processing circuitry to perform one or more functionalities as described herein.

According to a third aspect, some embodiments include a method performed by a network node for indicating one or more sidelink carriers for a wireless device to use in its data transmissions.

The method comprises: obtaining a threshold related to a data rate; determining one or more sidelink carriers based on the threshold; selecting one or more sidelink carriers from the determined one or more sidelinks carriers for data transmission; transmitting an indication of the one or more selected sidelink carriers to the wireless device.

According to a fourth aspect, some embodiments include a network node configured, or operable, to perform one or more functionalities (e.g. actions, operations, steps, etc.) as described herein.

In some embodiments, the network node may comprise one or more communication interfaces configured to communicate with one or more other radio nodes, wireless devices and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the network node, configure the processing circuitry to perform one or more functionalities as described herein.

The advantages/technical benefits of the embodiments of the present disclosure are as follows:

The embodiments enable a UE which is capable of transmitting on multiple sidelink carriers, to use methods and rules for selecting the proper sidelink carrier(s) taking into account sidelink carrier measurements and QoS, and, ensure fair usage of the available spectrum and limited UE batter consumption.

This summary is not an extensive overview of all contemplated embodiments, and, is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

Figure 1:
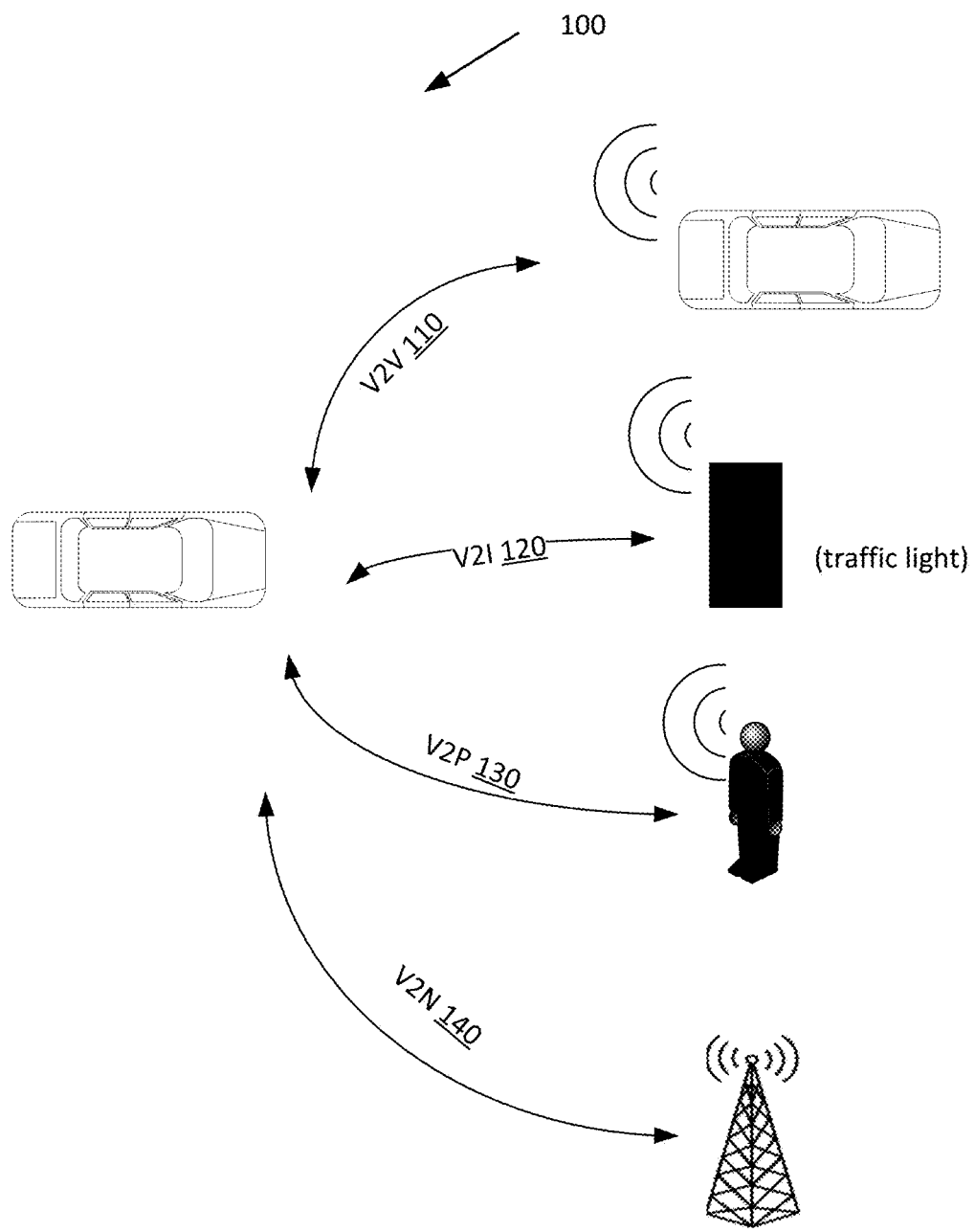
FIG. 1 illustrates a schematic diagram of different types of V2X communications.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

In this disclosure, the terminology "sidelink carrier", is used to indicate a carrier in which sidelink operations can be performed. The sidelink carriers can be deployed in a dedicated unlicensed spectrum (e.g. 5.9 GHz currently dedicated to ITS use) or deployed in the cellular licensed spectrum where other Uu operations can take place. The Uu refers to the radio interface used for communications in DL/UL from/to the eNB to/from the UE.

The configuration disclosed hereinafter can be provided via broadcasting signaling or dedicated signaling or pre-configured in the UE by higher layers or stored in the UE universal integrated circuit card (UICC) or directly in the UE.

The terminology "traffic identifier" is used to address different traffics corresponding to different services with different Quality of Service (QoS). Examples of traffic identifiers are Prose Per Packet Priority (PPPP), Logical Channel Identity (LCID), Logical Channel Group (LCG), destination indexes.

The congestion measurements (i.e. CBR measurements) can be taken as criteria to determine whether to use or not use a sidelink carrier. Without loss of generality, the same embodiments can be used for other types of channel quality measurements, e.g. Reference Signal Strength Indicator (RSSI), Reference Signal Received Power (RSRP), Reference Signal Received Quality (RSRQ), or interference measurements.

In the following embodiments, methods to determine which and how many carriers the UE can use for sidelink transmissions are disclosed.

The "number of carriers selected" refers to the number of carriers selected by the UE for sidelink transmissions during a certain time period. The time period can be configurable by the network or pre-configured or up to UE implementation. For example, configuration and traffic conditions may not allow a UE to use more than X number of carriers during Y ms. For instance, if Y=1 ms, the UE cannot perform sidelink carrier aggregation employing more than X carriers. As shown below, different embodiments for determining the number of carriers a UE can use are described. The UE can use the determined carriers in carrier aggregation for example.

Embodiment 1—Carrier Selection on the Basis of Sidelink Buffer Status

In this embodiment, the eNB configures a UE to transmit using different numbers of sidelink carriers depending on the required data rate. The required data rate can be represented by the UE sidelink buffer status, for example.

For eNB scheduled operations (i.e. mode-1, mode-3), the eNB receives the SideLink-Buffer Status Report (SL-BSR) on a Medium Access Control Control Element (MAC CE). From the SL-BSR, the eNB determines the amount of data in the UE buffer for different logical channels or logical channels groups (LCG), and it determines the number of carriers that need to be scheduled for the UE. The eNB also determines the set of carriers in which the UE is allowed to be scheduled from the logical channels (where each logical channel is mapped to one or more PPPPs) and/or from the destination indexes reported in the MAC CE. In both cases, the higher layers configure the Access Stratum (AS) of the UE and eNB with a mapping between destination indexes and frequency/sidelink carriers, or with a mapping between PPPPs and frequency carriers. The eNB can therefore determine the number of carriers the UE needs (depending on the sidelink buffer status), and the actual carriers that can be scheduled depending on the specific PPPP and/or destination index reported by the UE.

For UE autonomous resource selection (i.e. mode-2, mode-4), the eNB configures data rate thresholds to determine how many sidelink carriers the UE can autonomously select for sidelink operations. The data rate thresholds may be represented in terms of sidelink buffer status. The eNB can for example configure different set of ranges and thresholds. Each range is determined by one lower bound threshold and one upper bound threshold with respect to the amount of available data (e.g. expressed in bytes). To each range may be associated a maximum number of sidelink carriers (or a range of sidelink carriers) that the UE is allowed to select. The number of allowed sidelink carriers can be signaled explicitly for each range, or alternatively each range only indicates the additional carriers that are allowed to be used compared with the lower ranges.

The thresholds associated with the sidelink buffer status may take into account the whole UE sidelink buffer or they can be associated only with certain traffic identifiers. For example, in case PPPP is used, the eNB may associate only some PPPPs or a range of some PPPPs to the SL-BSR range configuration. Therefore, the SL-BSR range configuration will be per PPPP or per range of PPPPs. PPPPs or a range of PPPPs which do not have an associated SL-BSR configuration from which a number of sidelink carriers can be selected, cannot use more than one sidelink carrier irrespective of how much data is currently stored in the sidelink buffer. In one example, the eNB may configure specific sidelink buffer status ranges and associated number of allowed sidelink carriers only for the important data (e.g. high priority PPPP or only for certain destination indexes corresponding to road-safety services). For the less important data, the eNB may not configure any additional sidelink carriers. As such, the UE cannot use any additional carriers for sidelink operations, i.e. the UE will use the sidelink carriers already in use to transmit the lower priority data.

In an alternative example, the eNB can configure a mapping between the sidelink buffer status and a maximum allowed number of carriers to be used only for the low priority data. In this case, for the high important data, the UE does not provide a mapping between the SL buffer status and number of carriers; as such the UE is free to select any number of the available carriers.

In another example, a variation in the sidelink buffer status can be used to trigger a change in the number of carriers to be used for sidelink transmissions. For example, a delta on the amount of data currently in the sidelink buffer compared with a previous measurement of the sidelink buffer could be used. If the delta is higher than a certain threshold, a new carrier may be added to the number of sidelink carriers already in use by the UE for sidelink transmissions; if the delta is negative, i.e. below the threshold, a sidelink carrier should be removed from the number of sidelink carriers already in use by the UE, otherwise (e.g. delta is zero) the same number of carriers is used. The measurements of the sidelink buffer may be performed periodically, or they may be continuously monitored (e.g. every TTI) or at specific intervals, and they may be averaged over a certain time period (which can be configured or determined by the UE implementation).

It should be noted that in this embodiment, rather than indicating the number of allowed sidelink carriers, the eNB can indicate the actual carrier frequencies or carrier indexes that the UE is allowed to select for the associated buffer sidelink status. The indicated carrier frequencies or carrier index may be different for different traffic identifiers (e.g. PPPPs/LCIDs/destination indexes) and may depend on higher layer configuration which maps different traffic identifiers to different carriers/frequencies.

Embodiment 2—Carrier Selection on the Basis of Bit Rate Per Carrier

In this embodiment the carrier selection is determined by the maximum amount of data the UE is allowed to transmit on a certain carrier. This embodiment ensures a fair usage of the different sidelink carriers, since the (pre)configuration can put a cap on the maximum amount of data a UE can inject in a certain carrier. This also allows UEs, which have limited Radio Frequency (RF) capability in terms of transmitting chains and can only transmit on a limited number of carriers, to experience low amount of interference/congestion.

In a first example, for each carrier and for each UE, a configuration with different thresholds on the amount of data may be provided. More specifically, the UE can be configured with a threshold on the maximum amount of data that can be transmitted on a certain carrier per UE.

In the first example, the UE, when preparing the MAC Packet Data Units (PDUs) for transmission on a first carrier, will allocate resources to a first carrier until the maximum amount of data for that UE on the first carrier is reached. Once the maximum amount of data is reached, the UE can select a second carrier to transmit the remaining data that were not transmitted by the first carrier.

In a second example, the UE can be configured with a threshold on the maximum amount of data that can be transmitted on a certain carrier per traffic identifier. The UE, when preparing the MAC PDUs for transmission on a first carrier, will allocate resources for the first carrier until the maximum amount of data configured for a first traffic identifier is reached. Once the maximum allowed data is reached for the first traffic identifier, the UE is allowed to select a second sidelink carrier for transmission of the remaining data associated with the first traffic identifier and not transmitted on the first carrier. The traffic identifiers can be processed by the UE in a priority order, e.g. following the logical channel prioritization.

In another example, the UE is configured with both a threshold (first threshold) on the maximum amount of data that can be transmitted on a certain carrier per UE, and with a threshold (second threshold) on the maximum amount of data that can be transmitted on a certain carrier per traffic identifier. The UE, when preparing the MAC PDUs for transmission on a first carrier, will allocate resources for the first carrier until the maximum amount of data for the first carrier is reached or until the maximum amount of data for the traffic identifier is reached. Then, the UE may select a second carrier if either the first threshold or the second threshold is reached. If the second threshold is reached first, the UE will continue preparing the MAC PDUs for transmission on the first carrier until the first threshold is reached. When the first threshold is reached, the UE will select a second carrier for transmission.

If the traffic identifier is not configured with a threshold for the maximum amount of data rate, it means that there is no limit on the amount of data that can be injected on a certain sidelink carrier for the traffic corresponding to that traffic identifier. Then, it is up to the UE implementation to determine the number of carriers and which carriers to use for sidelink transmissions of that traffic identifier. The UE can for example use the amount of data currently present in the UE buffer (as per Embodiment 1) for that specific traffic identifier to determine whether to use an additional carrier or not. Alternatively, the network node can indicate by configuration the PPPPs, for which there is no limit on the amount of data that can be injected on a certain sidelink carrier, thereby allowing the UE to transmit data associated with those indicated PPPPs on any available sidelink carrier.

In a variant of this embodiment, methods to remove carriers are provided. For example, if the amount of data transmitted on a currently used carrier is less than a certain threshold, the UE shall stop using that carrier. Or, if the amount of data associated with a certain traffic identifier and transmitted on a currently used carrier is less than a certain threshold, the UE shall stop using that carrier for that traffic identifier.

From a configuration perspective, the threshold on the maximum amount of data may be represented by a cap on the allowed amount of bit or bit rate (expressed e.g. in the Kbytes or Kbit).

Embodiment 3—Carrier Selection on the Basis of Timer

In this embodiment, the number of carriers selected by the UE (possibly following any of the methods disclosed in Embodiments 1 and 2) are kept for a certain time. This time can be represented by a timer configured by the network node, or pre-configured in the UE, or selected by the UE implementation. If the carrier selection is only determined based on the amount of data in the buffer, the UE might frequently switch between different carriers. Therefore, this timer can prevent the UE from ping pong effects, which would cause too frequent RF switches between the different carriers, thereby affecting battery consumption. In the methods of Embodiment 1, the ping pong effects may be due to sudden changes in the UE buffer status or sudden arrival in the UE buffer of data burst or radio channel fluctuations. The timer can be for example configured to be the same as the time period used to compute the average of the radio channel quality, or the sidelink buffer status, etc.

Furthermore, once a certain number of sidelink carriers is selected, such number cannot be changed until the timer expires, i.e. no additional sidelink carriers can be used, no sidelink carriers already in use can be removed. The timer expiry triggers a possible change in the number of selected carriers. Alternatively, it is possible to change the number of selected carriers. To do so, different timers can be used to determine the addition (addTimer) of new carriers and the removal (remTimer) of carriers already in use. For example, when the addTimer is running, the UE is not allowed to add new carriers. When this timer expires the UE is allowed to add new carriers. In the same way, when the remTimer is running, the UE is not allowed to remove currently carriers in use. When this timer expires the UE is allowed to remove one or more of the currently carriers in use.

Those timers may also filter out fluctuations in the UE buffer status and sudden arrival of data burst in the UE buffer, or normalize the channel fluctuations.

After a new carrier is selected, or a carrier already in use is removed, the UE restarts the timer(s) addTimer and remTimer respectively.

Embodiment 4—Carrier Selection on the Basis of the Interference/Congestion

In this embodiment, thresholds on the level of interference/congestion of the sidelink carrier are used as a criterion for determining the number of carriers or selecting particular carriers. For example, the CBR measurements can be used as a metric to evaluate the level of congestion/interference of the sidelink carrier. In case multiple transmitting resource pools are available for transmission in the sidelink carrier, the UE may compute the average CBR measured across all the pools available in the carrier or across all the subchannels (i.e. a set of contiguous Physical Resource Blocks (PRB)) in the pools and compared it with a CBR threshold. Furthermore, the UE can change the transmitting pool but not the transmitting sidelink carrier, if the UE determines another pool in the same carrier which has a CBR below the CBR threshold. In another example, the aggregated CBR computed all over the pools or all over the subchannels in the pool is considered and compared with the CBR threshold. The average and the aggregated CBRs of the pools should be measured over a certain time interval of Xms, which can e.g. be (pre)configured. The measurements over the last Xms can be taken as a benchmark when comparing the average or aggregated CBR with the CBR threshold.

The network or the UE implementation may (pre)configure a CBR threshold (referred to as threshold B) for determining the maximum level of congestion that the UE should experience before stopping using a sidelink carrier. In one example, the UE is allowed to stop using the sidelink carrier when the congestion is above the CBR threshold B. In another example, the UE must/shall stop using the sidelink carrier when the congestion is above the threshold B.

The network or the UE implementation may also (pre) configure a CBR threshold (referred to as threshold A) for determining the maximum level of congestion that the UE should experience before being allowed to start using a given (new) sidelink carrier.

In one example, the CBR thresholds A and B can be the same (just referred to as the CBR threshold), i.e. below this CBR threshold, the UE can use the carrier, and, above this CBR threshold, the UE cannot. In another example, the CBR threshold B and the CBR threshold A can be the same for all data irrespective of the traffic identifier (e.g. PPPP). In a further example, the CBR threshold B and the CBR threshold A can be the same and common to a set of one or more PPPPs.

Furthermore, in case the CBR threshold B is not configured, it can be assumed that, if a CBR measurement is above the CBR threshold A for a sidelink carrier, the UE should stop using the sidelink carrier for the transmission of data with the associated PPPP. In case a PPPP is not associated with any CBR thresholds, it can be assumed that the UE is allowed to transmit data associated with that PPPP regardless of the CBR condition. Alternatively, it can be assumed that the UE should not transmit any data associated with that PPPP and/or the UE should inform the network about this situation, e.g. with RRC signaling. In another example, if the CBR threshold configuration is such that the UE cannot transmit data associated with a given PPPP in any available sidelink carriers, the UE informs the network about that situation, and the eNB may assign dedicated resources for the transmission of data associated with the given PPPP.

In the above latter example, different CBR thresholds A and B might be configured for different PPPPs. For example, the network (or the UE implementation) may configure a lower CBR threshold A for high priority data and a higher CBR threshold A for lower priority data (see for example threshold A 225 for PPPP1 (high priority) and threshold A 220 for PPPP2 (lower priority) of FIG. 2). In this way, only when the CBR measurement is low enough (i.e. below the threshold A associated with a certain PPPP), the UE is allowed to use the carrier for the transmission of the data/packets with the certain PPPP. In this way, for the lower priority packets, the threshold A value is higher, and as such the constraint on the minimum experienced CBR for these packets is more relaxed. In the opposite for the higher priority packets the threshold A value is lower, meaning that the CBR requirement is more stringent for the transmission of the packets of higher priority.

Figure 2:
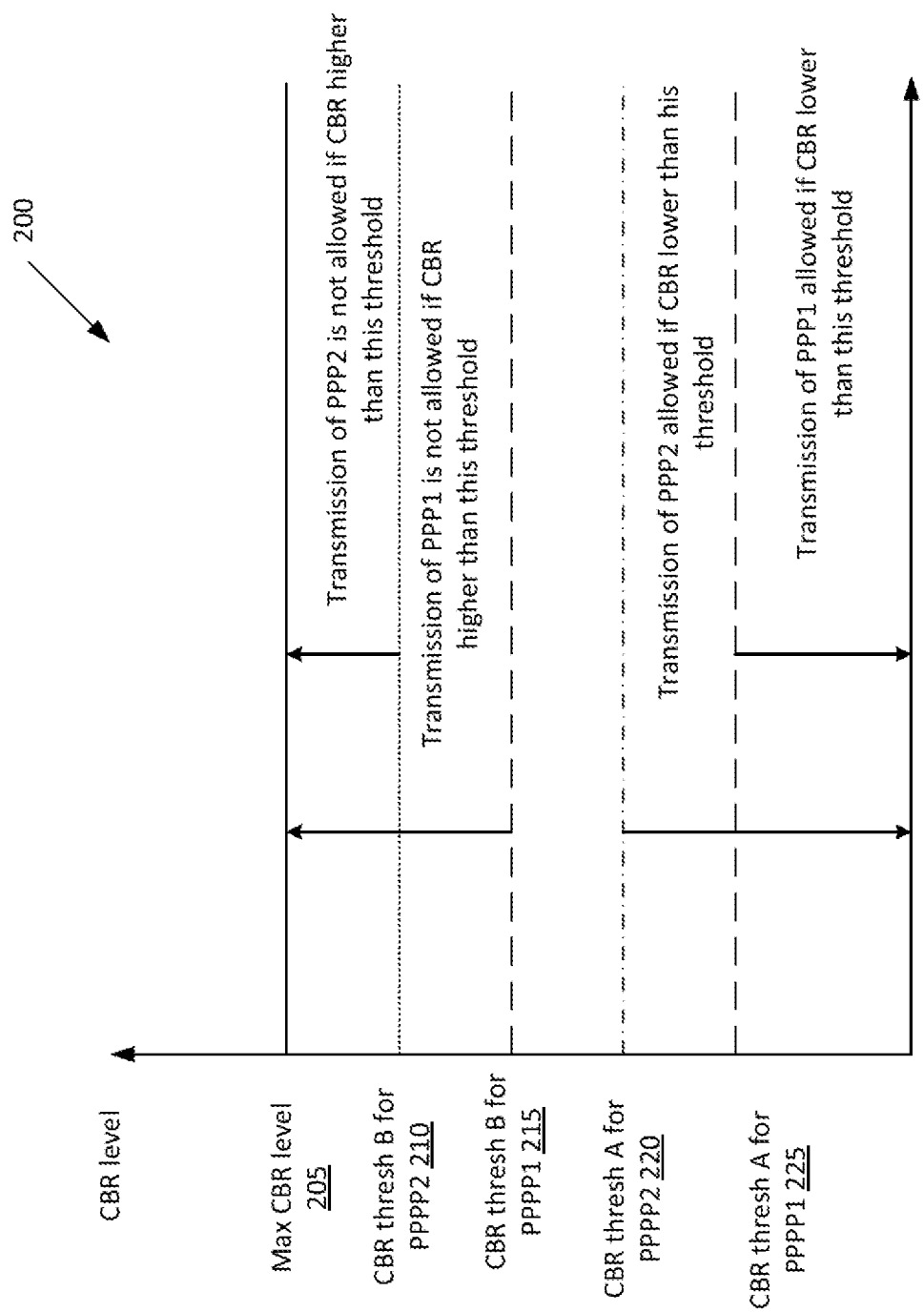
FIG. 2 is an illustration of a configuration of different thresholds, according to an embodiment.

Similarly, for the CBR threshold B, the network (or the UE implementation) may configure a lower CBR threshold B for high priority data and a higher CBR threshold B for lower priority data (see threshold B 215 for PPPP1 and threshold B 210 for PPPP2 of FIG. 2). By differentiating the values of the threshold B for different packet priorities, the UE will be allowed to stop using (or will be required to stop using) the carrier for the transmission of the high priority packets when the measured CBR values are lower than the threshold B configured for the lower priority packets but higher than the threshold B configured for the high priority data. Since the value of the threshold B for lower priority data can be configured to be higher than the value of the threshold B for higher priority data, the constraint on the maximum sustainable CBR for the lower priority data can be more relaxed.

Therefore, the UE might select a different number of carriers depending on the PPPP of the packets to be transmitted. In particular, for a given carrier, the UE considers for transmission only the sidelink logical channels associated with the packet priority(ies) (PPPPs) which are allowed to be transmitted in the given carrier, given the experienced CBR measurement and CBR thresholds configuration defined above. Considering that more than one PPPP could be transmitted in the same transport block, the UE might take into account the highest priority PPPP (or lowest priority PPPP) when selecting the carriers.

In some cases, it might be beneficial for the UE to remove one or more sidelink carriers currently in use. This may be due to channel quality becoming bad or channels becoming congested in the resource pool the UE is using in a certain carrier. For example, if the CBR of a carrier becomes higher than the CBR threshold B (e.g. according to measurements performed over a certain time period) the UE shall stop using such carrier. In order to avoid that the UE stops using a certain carrier unnecessarily, the UE shall stop using such carrier only if the CBR of that carrier becomes higher than the CBR threshold B. If the CBR is below such threshold, the UE should keep using it. In an alternative, the UE is allowed to stop using such carrier even if the CBR is below the CBR threshold B and above CBR threshold A.

In order to avoid that many UEs simultaneously stop using a certain sidelink carrier when the CBR of the sidelink carrier becomes higher than the CBR threshold B (thereby generating ping-pong effects between multiple sidelink carriers), each UE can stop using a certain sidelink carrier when the CBR is above a CBR threshold B with a certain probability. The UE can randomly select a value and if this value is above a certain (pre)configured probability, the UE can stop using the sidelink carrier for sidelink transmissions. Multiple different probabilities may be configured depending on how long (i.e. time interval) the UE has been using a carrier.

The same or different probabilities can be also configured for the CBR threshold A, i.e. to determine whether the UE can start using the sidelink carrier when the measured CBR is below the CBR threshold A.

The above thresholds and probabilities can be either signaled in dedicated fashion or in broadcast signaling or preconfigured in the UE or by the core network/V2X server/application.

This embodiment can be combined with any of the previous embodiments. A possible configuration 200 of the CBR thresholds A and B is illustrated in FIG. 2.

In this configuration 200, a maximum level of CBR 205 is provided, above which no data transmissions are allowed due to the poor quality of the sidelink carriers.

The configuration also provides a CBR threshold B associated with PPPP2 210, a CBR threshold B associated with PPPP1 215, a CBR threshold A associated with PPPP2 220 and a CBR threshold A associated with PPPP1 225.

In this case, if a measured CBR of a sidelink carrier is below the CBR threshold A associated with PPPP1 225, the UE can select that sidelink and start data transmissions for PPPP1 type of traffic on that sidelink carrier. If later on, the measured CBR of that sidelink carrier is above the threshold 225 but below the CBR threshold B 215, the UE can decide to keep using that sidelink carrier. But, it cannot start using a new sidelink associated with PPPP1 traffic. If the measured CBR of that sidelink keeps increasing and becomes higher than the CBR threshold B for PPPP1 215, then, the UE stops using that sidelink for PPPP1 data transmissions.

In a similar way, the above description applies to the traffic of type PPPP2, using the CBR threshold A 220 and CBR threshold B 210 as thresholds for starting, keeping and stopping PPPP2 data transmissions on a particular sidelink carrier.

Embodiment 5—Carrier Selection on the Basis of Weighted Congestion/Interference Measurements In this embodiment, the CBR measurements on a sidelink carrier are weighted with a configured weight factor. Such a weight factor can be different for different packet priorities and configured for example to be inversely proportional to the CBR value, i.e. the lower the CBR measurements, the higher the weight factor.

For example, the eNB may configure the weight factor such that weighted CBR measurements are between 0 and 1. The weighted CBR measurements represent the probability to select a sidelink carrier, i.e. the UE randomly selects a value (e.g. between 0 and 1) and if such value is below the weighted CBR measurements, the UE will transmit on the sidelink carrier. Otherwise it will not.

The weight factor may be configured differently for different traffic priorities, e.g. PPPP, so that if the CBR measurements of a sidelink carrier are for example lower than a certain threshold, the probability to select such sidelink carrier is higher for high-priority data (which has strict QoS requirements) and lower for low priority data (which have more relaxed QoS requirements). If the CBR measurements of a sidelink carrier are for example higher than a certain threshold, the probability to select such sidelink carrier is higher for low-priority data and lower for high priority data.

Using similar methods, the weight factor can also be applied to determine when to stop using a sidelink carrier.

The weight factor associated with a certain data/traffic priority can be common for CBR measurements in a certain range of values. For example, the CBR measurements in a certain range can be rounded to some values (e.g. to the closest integer of 10). In such a case, the weight factor configured for the rounded values can be used. For example, if the CBR measurements are 13%, the UE rounds this value to 10% and applies the weight factor configured for a CBR value of 10%.

Alternatively, the network may explicitly associate with certain CBR measurements of a sidelink carrier a fixed probability for being selected by the UE. This probability can be different depending on the packet priority the UE has to transmit and can be common for a range of CBR values.

Embodiment 6—Carrier Selection on the Basis of Resource Reselection Events

In this embodiment the number of carriers and the specific carrier(s) to use are determined at the beginning of the resource selection procedure (e.g. when resource reselection counter is 0 or when resources are reselected for any other reasons). The number of carriers and the specific carrier(s) cannot be changed, if only instantaneous changes in the UE buffer status or sudden arrival of data burst in the UE buffer or sudden fluctuations in the channel conditions occur. In other words, the determined number of carriers can be changed only when resource (re)selection is triggered.

Furthermore, the UE is not allowed to change the transmitting carrier if it has already signaled (e.g. in Physical Shared Control Channel (PSCCH) signaling) to other UEs at time n the intention to transmit on resources (of the transmitting carrier) which come in at later subframes, at time n+X, for example. In this case, the UE will transmit the data at time n+X and it will change the transmitting carrier only after n+X, not in earlier subframes such as [n, n+X]. The UE may announce in PSCCH signaling at time n+X that a new carrier has been selected by the UE, the new carrier providing the transmitting time/frequency resources that the UE will use.

Events that trigger resource (re)selection may also comprise the measured CBR being above or below the CBR thresholds disclosed in Embodiment 4, as long as the event of being below or above the CBR thresholds persists for a certain time interval, which can be (pre)configured.

Another event that triggers resource (re)selection may be the measured CBR being above or below the CBR thresholds disclosed in Embodiment 4, but only if the carriers that the UE is using have a very poor CBR.

Embodiment 7: Which Carrier to Select for Adding/Removing

This embodiment is concerned with the determination of which (new) carriers to select (for performing sidelink transmissions) or to remove (from the carriers already in use) in the methods of the previous embodiments.

For example, the UE can first select a first set of carriers in which it is allowed to transmit according to higher layer configuration for a specific service (e.g. determined by any of the traffic identifiers). For example, spectrum regulatory bodies may configure the UE to use different carriers depending on the specific V2X service to be transmitted.

The UE can select a second set of carriers included in the first set, where the second set may be configured by the network or pre-configured in the UE for the specific buffer status conditions, and/or for the specific traffic identifier (e.g. PPPP). The second set can comprise only carriers in which the UE is capable to transmit, according to its radio capabilities, such as number of transmitting chain, supported band combinations, radio frequency limitations on certain carrier, etc.

If there is no overlapping between the second set and the first set, the UE selects any of the two sets, or the UE does not transmit, and/or the UE reports (e.g. using in-device coexistence signaling) that the second set configuration is not overlapping with the first set configuration. The UE may therefore signal its own radio transmitting capabilities.

The UE can select a third set of carriers, which can be included in the second set, on the basis of channel conditions (e.g. congestion measurement or interference situation, etc.) of the second set. The third set of carriers can comprise only carriers whose channel conditions are good enough, e.g. having a CBR below a configured threshold for the priorities of the packets to be transmitted. Therefore, the UE only considers the sidelink logical channels associated with the packet priorities that are allowed to be transmitted in this carrier given the experienced CBR measurement and threshold.

The UE can select a fourth set of carriers, which can be included in the third set, where the fourth set can comprise carriers in which the UE can transmit with the minimum amount of transmitting chains and in case there is more than one set of carriers in which the UE can transmit with the minimum amount of transmitting chains the UE selects the set of carriers which have lower congestion measurement (e.g. CBR). The fourth set may also comprise carriers in which the UE can transmit with the minimum amount of transmitting chains and that allow to transmit the maximum amount of data (e.g. depending on the Modulation Coding Scheme (MCS) allowed in those carriers). The latter case implies that the UE ranks the carriers according to a certain metric (e.g. less congested carriers, or carriers which allow larger amount of data to be transmitted).

In case some of the currently in use sidelink carriers shall not be used any longer (e.g. due to any of the methods disclosed in the previous embodiments), the UE first removes the carrier which is most interfered/congested (e.g. having CBR above a threshold), or the UE first removes the carrier which requires more RF capabilities, e.g. more transmitting chains or more gaps (assuming that some of the sidelink carriers can be used in a Time Division Multiplexing (TDM) fashion at different Transmission Time Intervals (TTIs) and that the gaps are required to transmit on such carriers).

Figure 3:
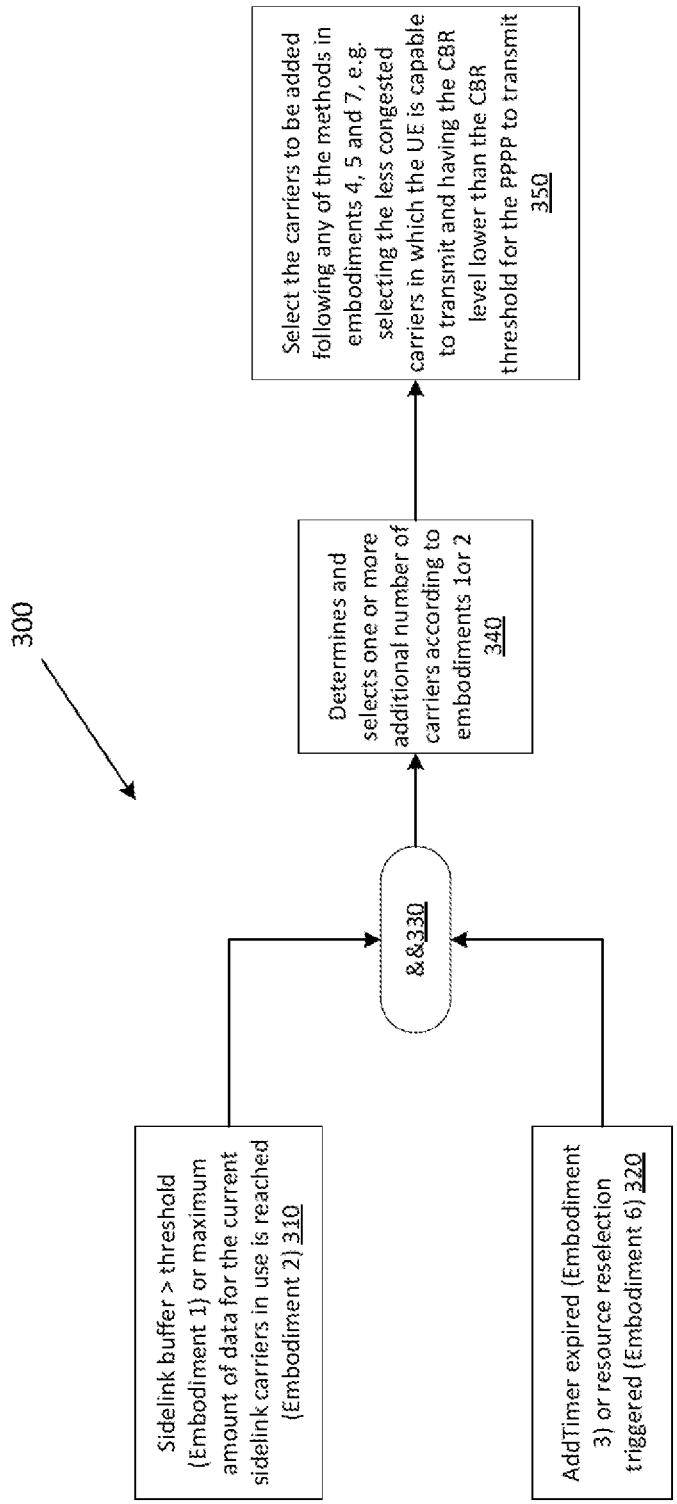
FIG. 3 is a flow chart of a method for adding sidelink carriers for data transmissions, according to an embodiment.
Figure 4:
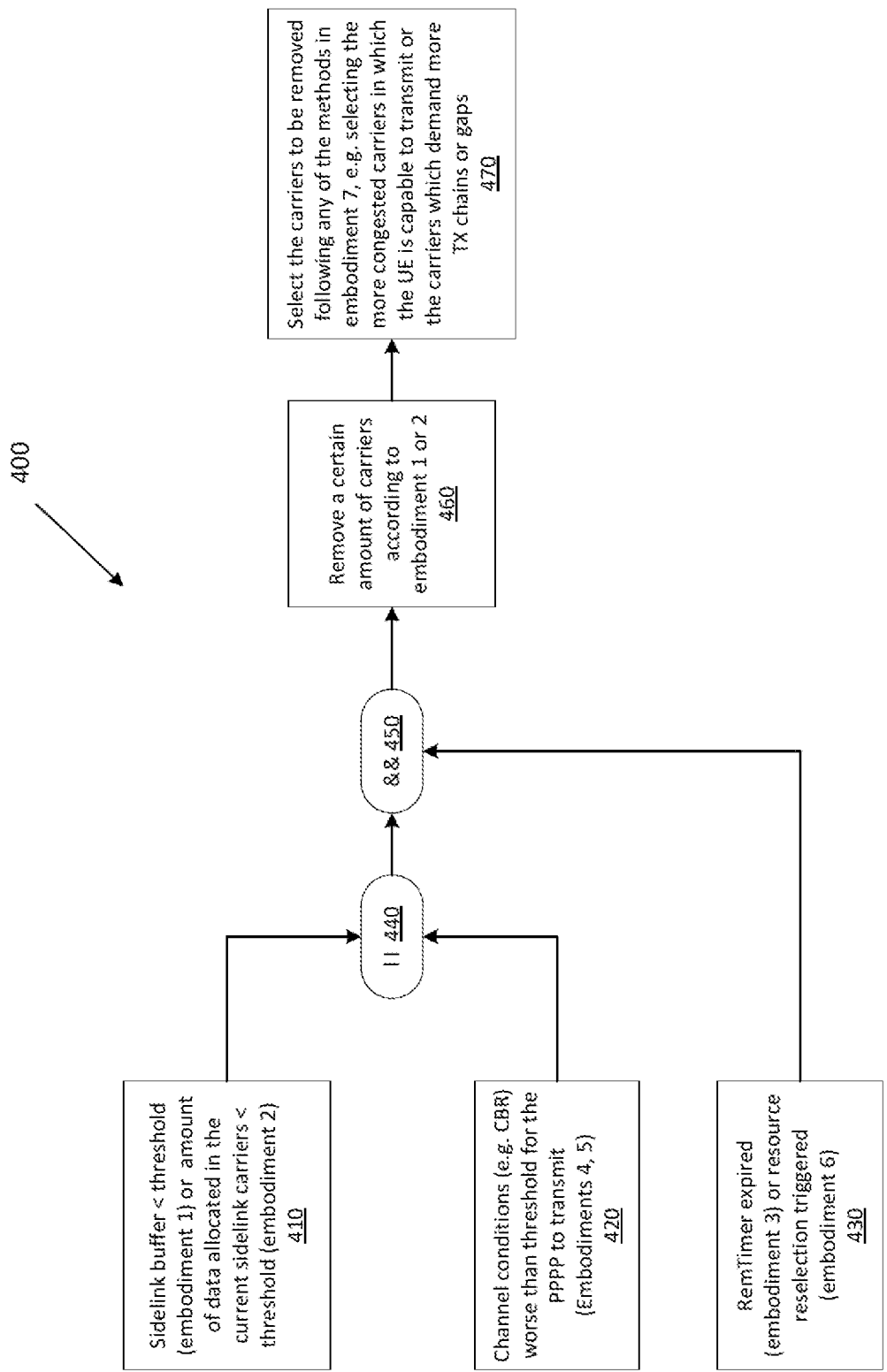
FIG. 4 is a flow chart of a method for removing sidelink carriers from a list of carriers for data transmissions, according to an embodiment.

An illustrative example of the interaction between the above disclosed embodiments is illustrated in FIGS. 3 and 4.

With reference to FIG. 3, a method 300 to add one or more sidelink carriers for data transmissions will be described. Generally stated, when step 310 and (&&) step 320 are true (step 330) then steps 340 and 350 are performed.

In step 310, if the UE determines that the data in the sidelink buffer is above a threshold according to embodiment 1 or that a maximum amount of data for the current sidelink carriers in use is reached (according to embodiment 2), AND (&& step330), In step 320, if the UE determines that the AddTimer is expired (according to embodiment 3) or that a resource reselection is triggered according to embodiment 6, Then, In step 330, the UE determines and selects one or more additional number of carriers according to embodiments 1 or 2.

In step 340, more specifically, the UE can select the one or more carriers (to be added to the currently used carriers) following any of the methods in embodiments 4, 5 and 7, e.g. selecting the less congested carriers in which the UE is capable to transmit and having the CBR level lower than the CBR threshold for the associated PPPP.

With reference to FIG. 4, a method 400 to remove one or more sidelink carriers from the list of sidelink carriers already in use will be described. Generally stated, if steps 410 or 420 are true (step 440) and if step 430 is true (step 450) then steps 460 and 470 are performed.

In step 410, if the UE determines that the sidelink buffer is below the threshold (according to embodiment 1) or that the amount of data allocated in the current sidelink carriers is below the threshold (according to embodiment 2), OR (ll step 440), In step 420, if the UE determines that the channel conditions (e.g. CBR) are worse than the threshold associated with the PPPP of the data for transmission (according to embodiments 4, 5), AND (&& step 450)

In step 430, the UE determines that the RemTimer has expired (according to embodiment 3) or that the resource reselection is triggered, Then, In step 460, the UE determines one or more sidelink carriers to be removed, according to embodiments 1, 2 or 4.

In step 470, the UE selects the one or more determined sidelink carriers to be removed, following any of the methods in embodiment 7, e.g. selecting the more congested carriers in which the UE is capable to transmit or the carriers which demand more TX chains or gaps.

Embodiment 8: Physical Layer Operations

This embodiment comprises the methods of any of the previous embodiments, in which the UE determines the number of carriers and/or the specific carriers to use based on the available physical resources, or congestion etc. In the current specification for sensing-based operation (mode-4), the lower layers produce/use sensing to generate a list of resources that are available (i.e., considered as unused) for transmission. The Medium Access Control (MAC) layer can select resources for transmission from this list. The UE may choose to transmit only on carriers with a minimum number of resources (in absolute or relative terms) and/or with minimum experienced CBR. As such, the UE may restrict the selection of carriers to one or several such carriers.

Figure 5:
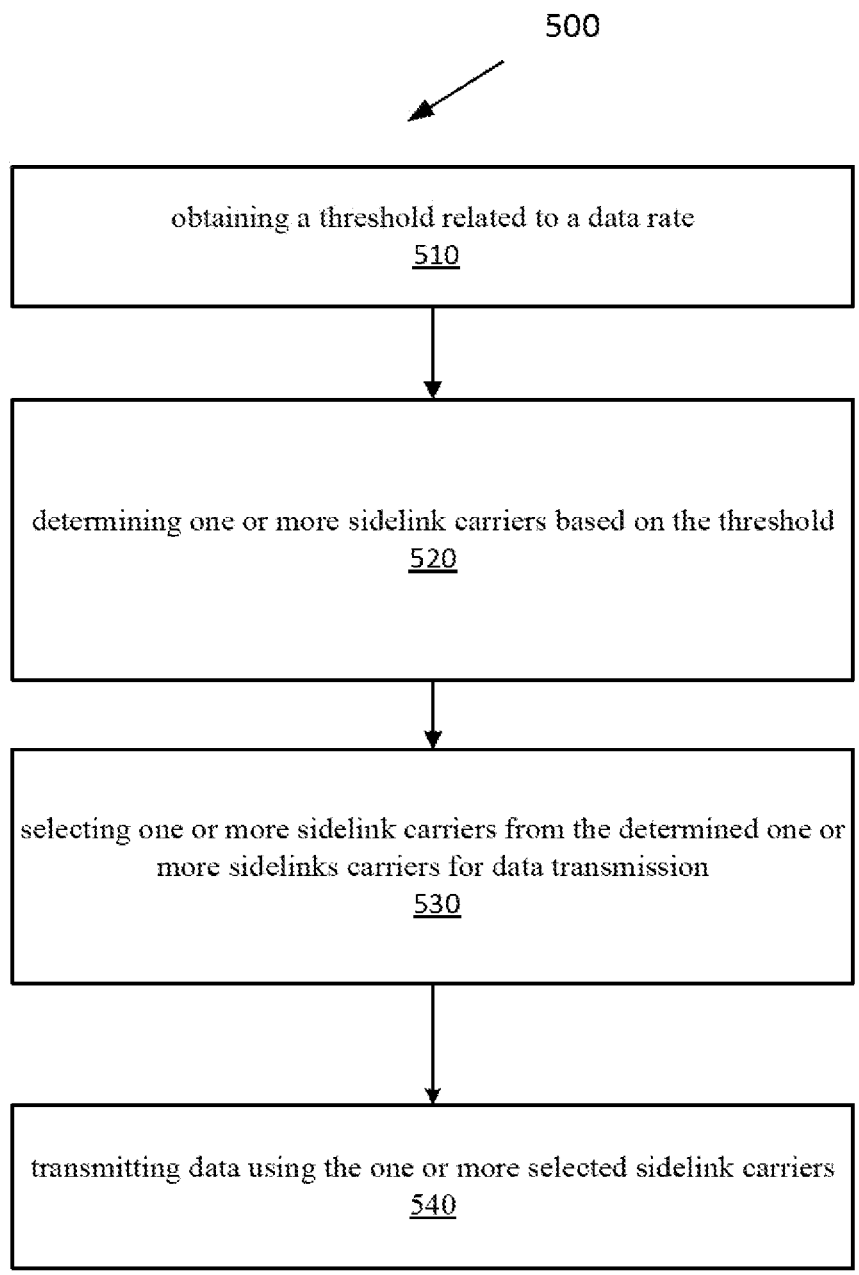
FIG. 5 is a flow chart of a method in a wireless device, for data transmissions, according to an embodiment.

Now turning to FIG. 5, a flow chart of a method 500 for data transmissions using sidelink carriers will be described. The method 500 can be implemented in a wireless device, for example the wireless device QQ110 of FIG. 7.

The method 500 comprises:

Step 510: obtaining a threshold related to a data rate;

Step 520: determining one or more sidelink carriers based on the threshold;

Step 530: selecting one or more sidelink carriers from the determined one or more sidelinks carriers for data transmission;

Step 540: transmitting data using the one or more selected sidelink carriers.

The step 510 of obtaining the threshold can comprise configuring the threshold by the UE or a network node, receiving the threshold from the network node, etc.

In a first case, the data rate is based on a buffer status of the wireless device (corresponding to embodiment 1, for example).

In this case, determining the one or more sidelink carriers can comprise determining a number of sidelink carriers needed to transmit the data rate or data in the buffer of the wireless device. For example, method 500 can determine the number of sidelink carriers by comparing the data rate/data in the buffer with the threshold, in order to determine how many sidelink carriers are needed to transmit the data in the buffer.

In some embodiments, the threshold is associated with a traffic type identified by a traffic priority identifier.

In some embodiments, the method 500 can select an additional sidelink carrier among the one or more sidelink carriers determined for data transmission when a current selected sidelink carrier has reached a maximum amount of data for transmission.

In a second case, the data rate comprises a bit rate of the sidelink carriers (corresponding to embodiment 2, for example).

For example, the bit rate can indicate an amount of data the wireless device is allowed to transmit on the sidelink carriers.

In this case, the threshold can be also configured per traffic identifier.

In some embodiments, the method can determine the one or more sidelink carriers by determining a first carrier for transmitting an amount of data equivalent to the threshold and further by determining a second carrier for transmitting a reminder of data to be transmitted.

In some embodiments, the method 500 can remove a carrier in the one or more selected sidelink carriers if an amount of data for transmission is less than the threshold.

In some embodiments, a timer can be used for keeping using the one or more selected carriers during a period of time. Furthermore, a first timer can be configured for the wireless device to add a selected carrier. This timer is referred to as the AddTimer. For example, after the expiry of the first timer, the wireless device is allowed to add one or more sidelink carriers. A second timer can be also configured for the wireless device to remove one or more selected carriers already in use among the one or more selected carriers. This timer can be referred to as the RemTimer. For example, after the expiry of the second timer, the wireless device is allowed to remove one or more sidelink carriers.

In a third case, the data rate can comprise a congestion measurement of the sidelink carriers (corresponding to embodiment 4, for example).

For example, the congestion measurement can be provided by a congestion busy ratio (CBR).

In this case, obtaining a threshold related to a data rate can comprise obtaining a first threshold for determining a maximum level of congestion that the wireless device can experience before stopping using a sidelink carrier. Furthermore, obtaining a threshold related to a data rate can also comprise obtaining a second threshold for determining a maximum level of congestion that the wireless device can experience before being allowed to start a new sidelink carrier.

In some embodiments, determining the one or more sidelink carriers based on the threshold can comprise: determining a measured CBR of a first sidelink carrier; and in response to determining that the measured CBR is below the second threshold, selecting the first sidelink carrier for data transmission and starting transmitting data on the first sidelink carrier.

In some embodiments, the method 500 ca comprise, in response to determining that the measured CBR is above the second threshold but below the first threshold, keeping transmitting on the first sidelink carrier but preventing a wireless device to select the first sidelink carrier to start using it if the first sidelink carrier was not used before.

In some embodiments, method 500 can comprise, in response to determining that the measured CBR is above the first threshold, stopping data transmission on the first sidelink carrier.

In this case, the threshold (or the first and second thresholds) can be associated with a traffic priority identifier.

In some embodiments, the congestion measurement can be weighted by a weight factor.

For example, the weight factor can be associated with a traffic priority identifier.

In some embodiments, the weighted congestion measurement can represent a probability to select a sidelink carrier.

In some embodiments, selecting the one or more sidelink carriers can be done at a beginning of a resource selection procedure.

Figure 6:
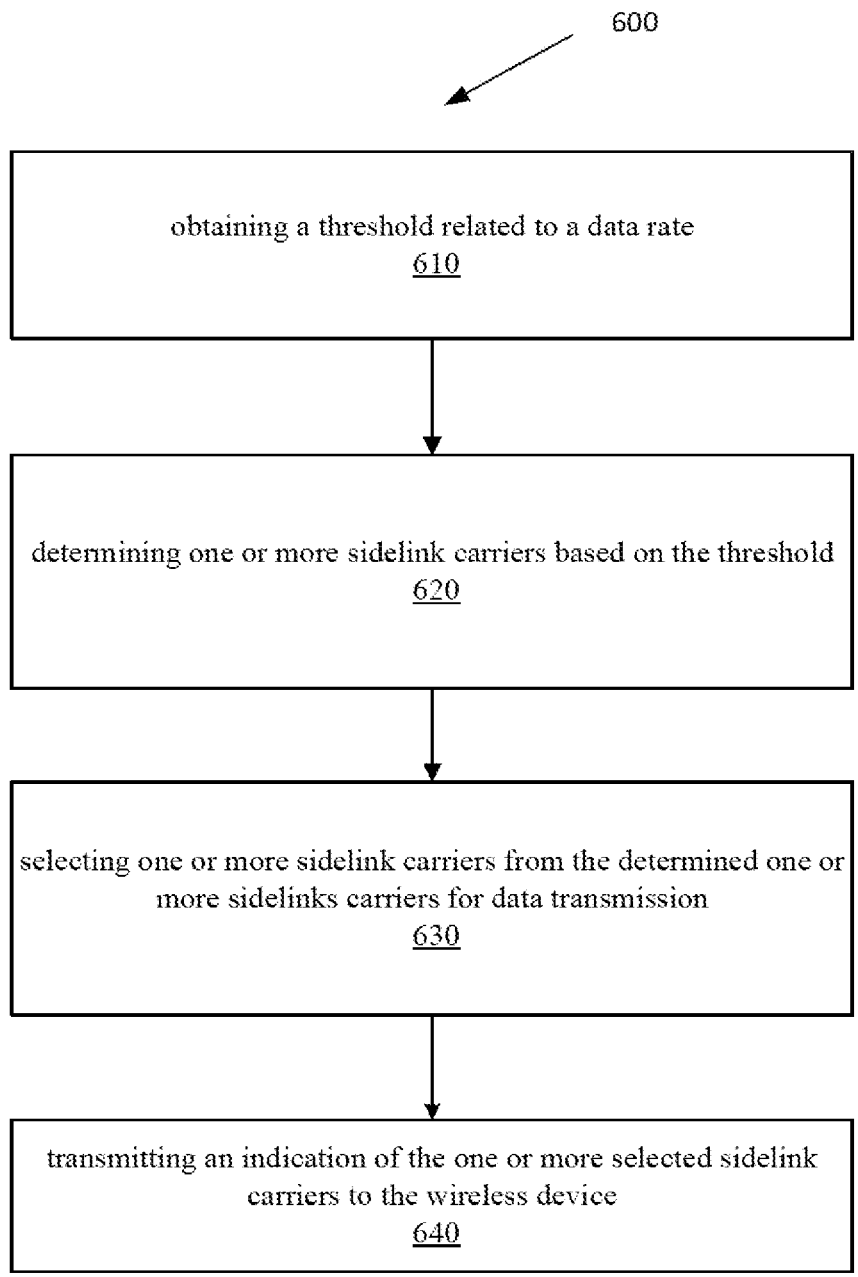
FIG. 6 is a flow chart of a method in a network node, for data transmissions, according to an embodiment

Now turning to FIG. 6, a method 600 for indicating one or more sidelink carriers for a wireless device to use in its data transmissions will be described. The method 600 can be implemented in a network node, for example the network node QQ160 of FIG. 7.

Method 600 comprises:

Step 610: obtaining a threshold related to a data rate;

Step 620: determining one or more sidelink carriers based on the threshold;

Step 630: selecting one or more sidelink carriers from the determined one or more sidelinks carriers for data transmission;

Step 640: transmitting an indication of the one or more selected sidelink carriers to the wireless device.

Obtaining the threshold related to a data rate in step 610 can comprise configuring a wireless device with the threshold or calculating a threshold based on data provided by the wireless device.

In a first case, the data rate can be based on a buffer status of the wireless device.

In this case, the network node can receive a buffer status report from the wireless device, the buffer status report comprising the buffer status of the wireless device.

In some embodiments, determining the one or more sidelink carriers can comprise determining a number of sidelink carriers needed to transmit the data rate.

In some embodiments, determining the number of sidelink carriers can comprise comparing the data rate with the threshold.

In this case, the threshold can be associated with a traffic type identified by a traffic priority identifier.

In a second case, the data rate can comprise a bit rate of the sidelink carriers.

For example, the bit rate can indicate an amount of data the wireless device is allowed to transmit on the sidelink carriers.

In this case, the threshold can be configured per traffic identifier.

In some embodiments, determining the one or more sidelink carriers can comprise determining a first carrier for transmitting an amount of data equivalent to the threshold and further determining a second carrier for transmitting a reminder of data to be transmitted.

In a third case, the data rate can comprise a congestion measurement of the sidelink carriers.

For example, the congestion measurement can be provided by a congestion busy ratio (CBR).

In some embodiments, obtaining a threshold related to a data rate comprises configuring a first threshold for determining a maximum level of congestion that the wireless device can experience before stopping using a sidelink carrier.

In some embodiments, obtaining a threshold related to a data rate comprises configuring a second threshold for determining a maximum level of congestion that the wireless device can experience before being allowed to start a new sidelink carrier.

In some embodiments, in the third case, the threshold is associated with a traffic priority identifier.

In some embodiments, the congestion measurement can be weighted by a weight factor. For example, the weight factor is associated with a traffic priority identifier.

In some embodiments, the weighted congestion measurement can represent a probability to select a sidelink carrier.

Figure 7:
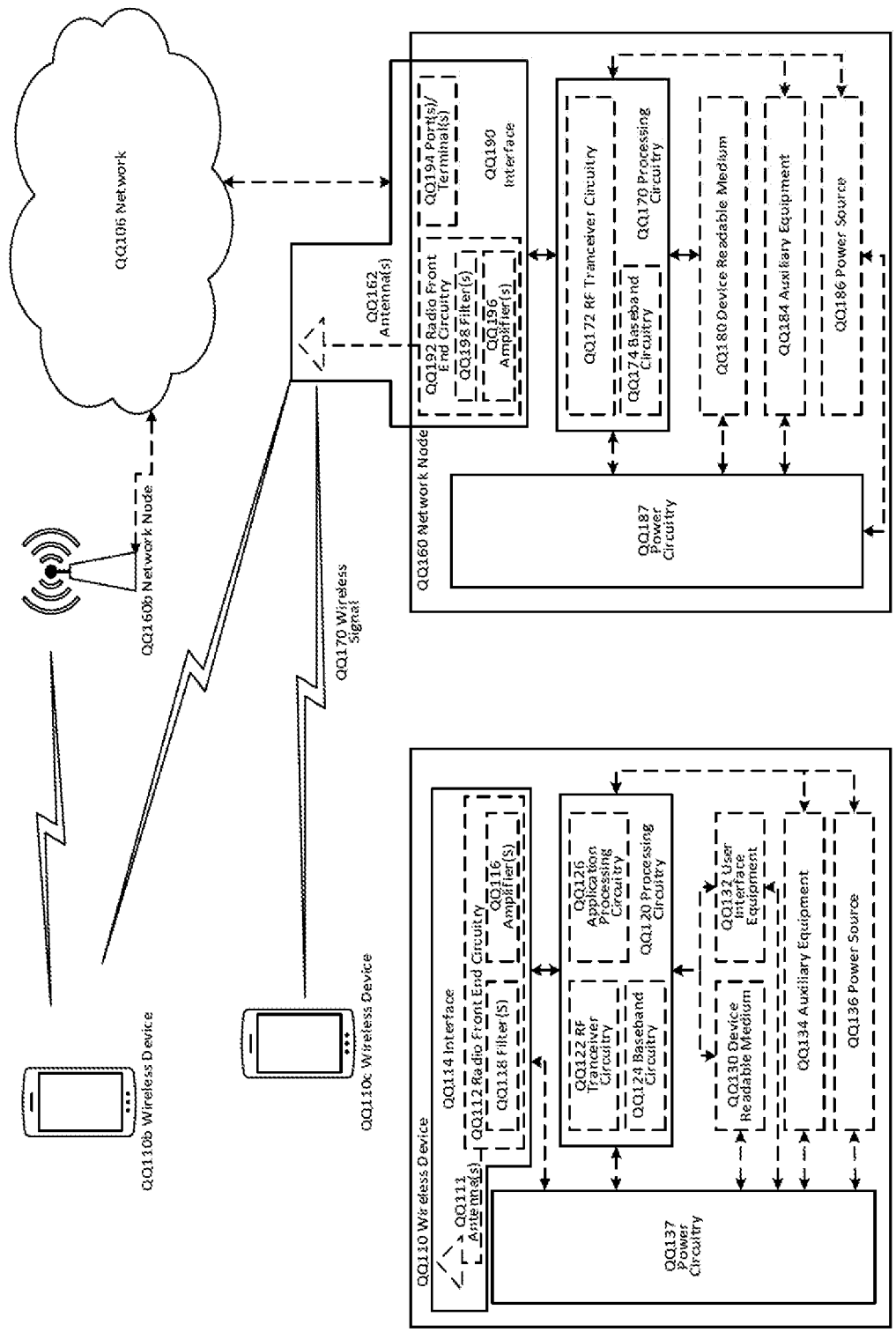
FIG. 7 illustrates a schematic block diagram of a wireless network, according to an embodiment.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein (such as method 600) as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described (such as method 500) herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 8:
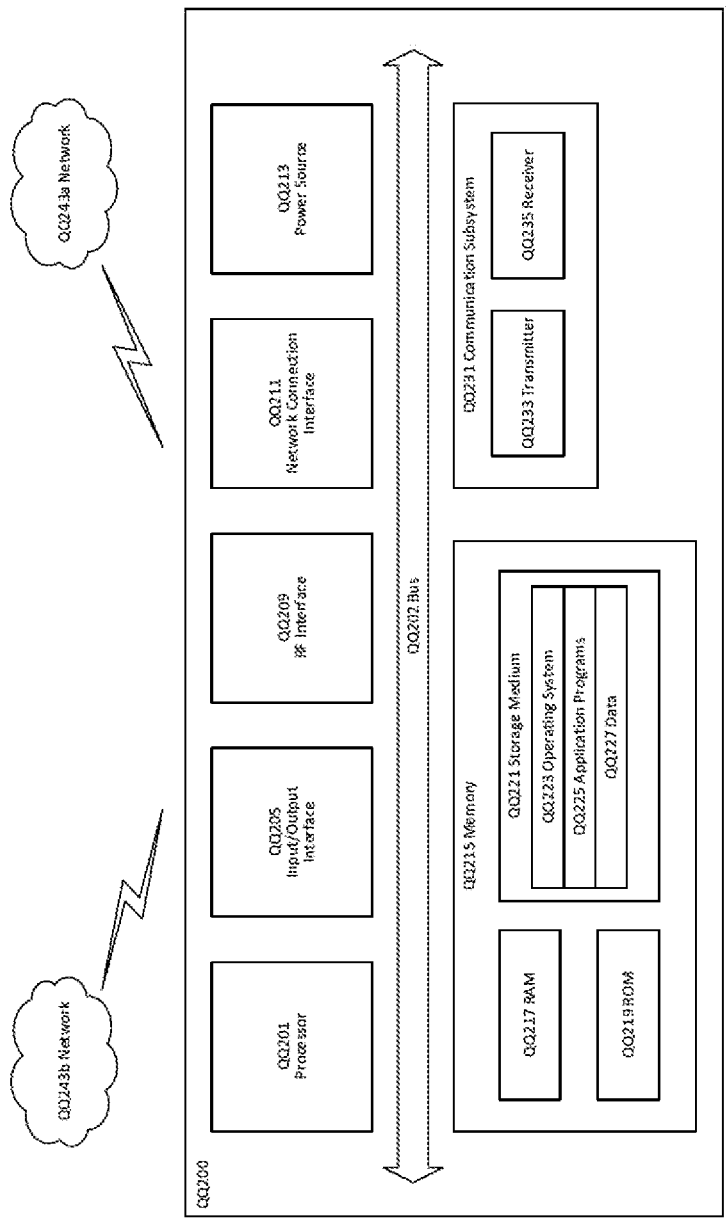
FIG. 8 illustrates a schematic block diagram of a wireless device/UE according to an embodiment.

FIG. 8 illustrates one embodiment of a UE in accordance with various aspects described herein. The UE can be the wireless device QQ110 of FIG. 7. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although Figure QQ2 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
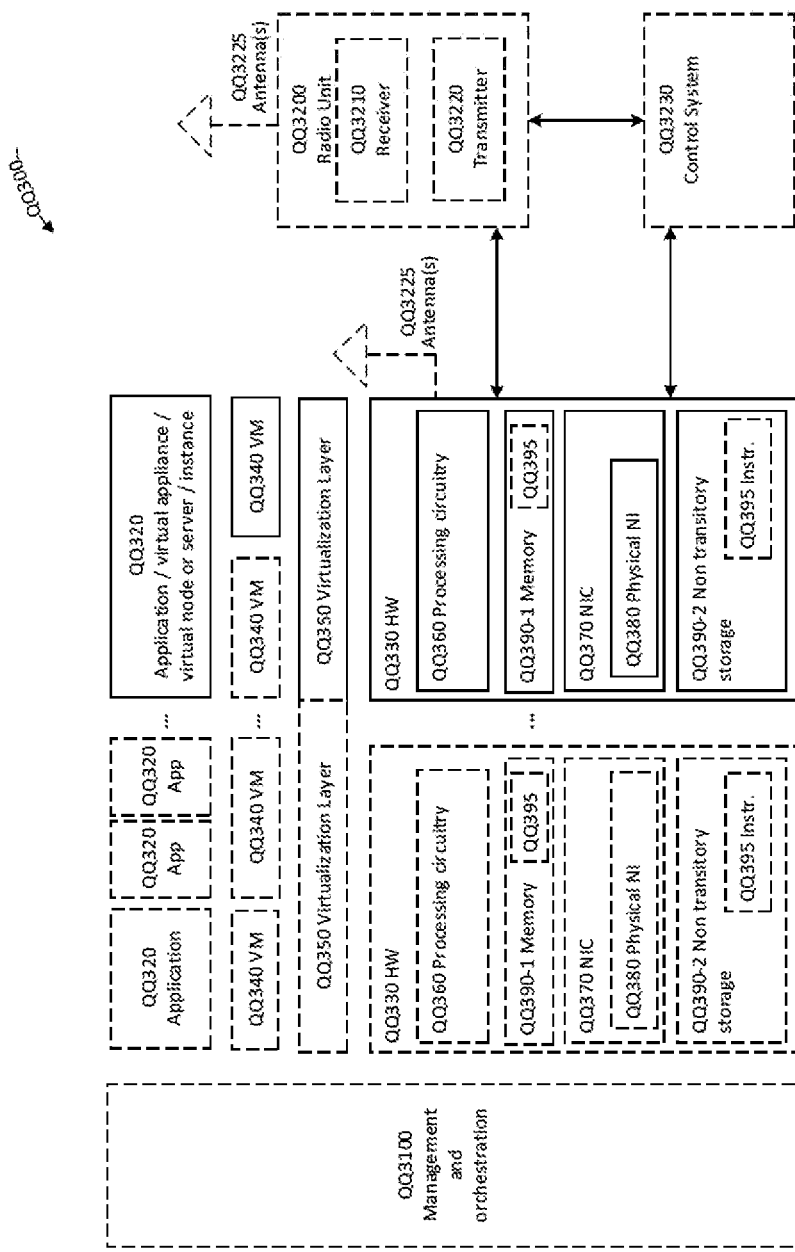
FIG. 9 illustrates a schematic block diagram illustrating a virtualization environment according to an embodiment.

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 10:
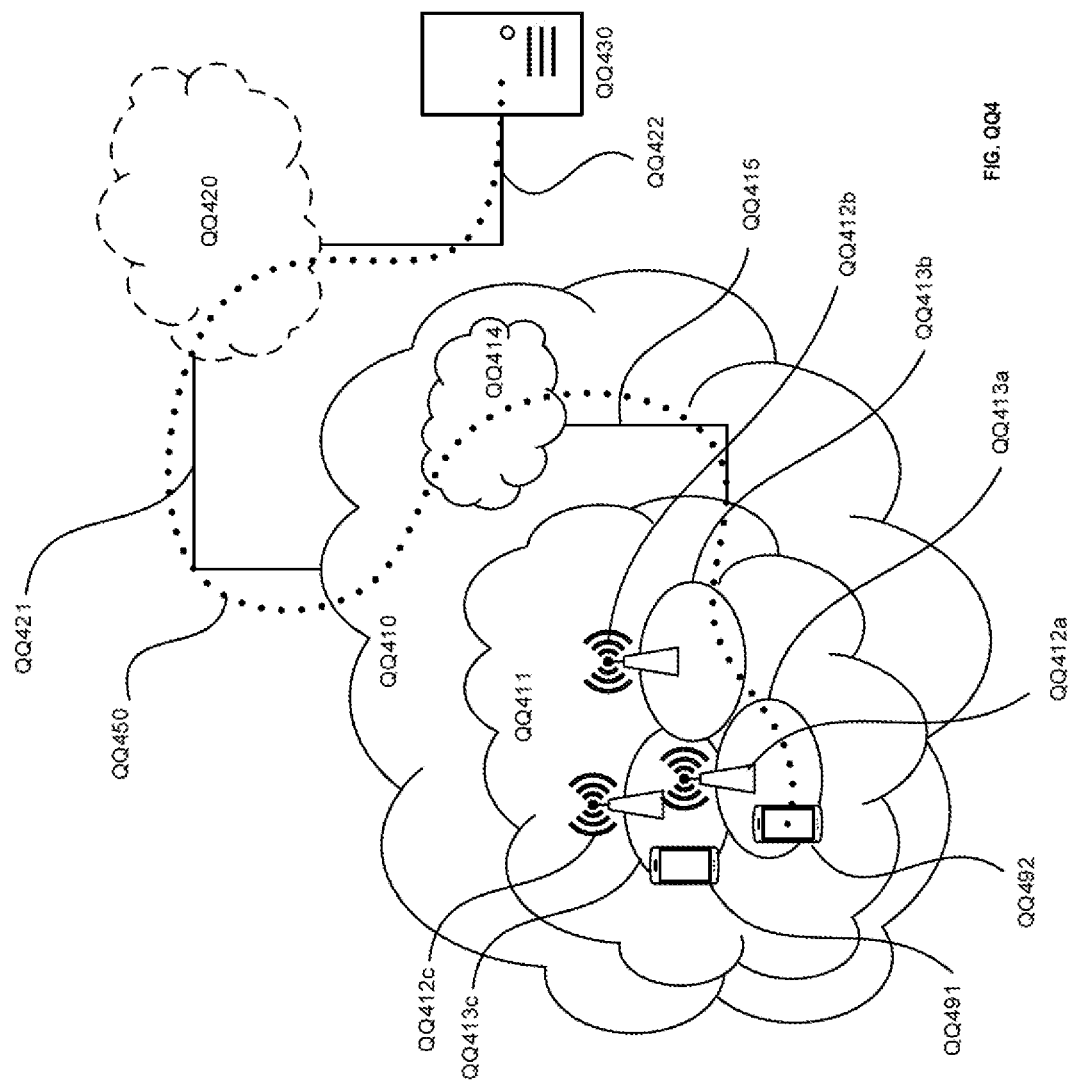
FIG. 10 illustrates a schematic block diagram of a telecommunication network connected via an intermediate network to a host computer, according to an embodiment.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 11:
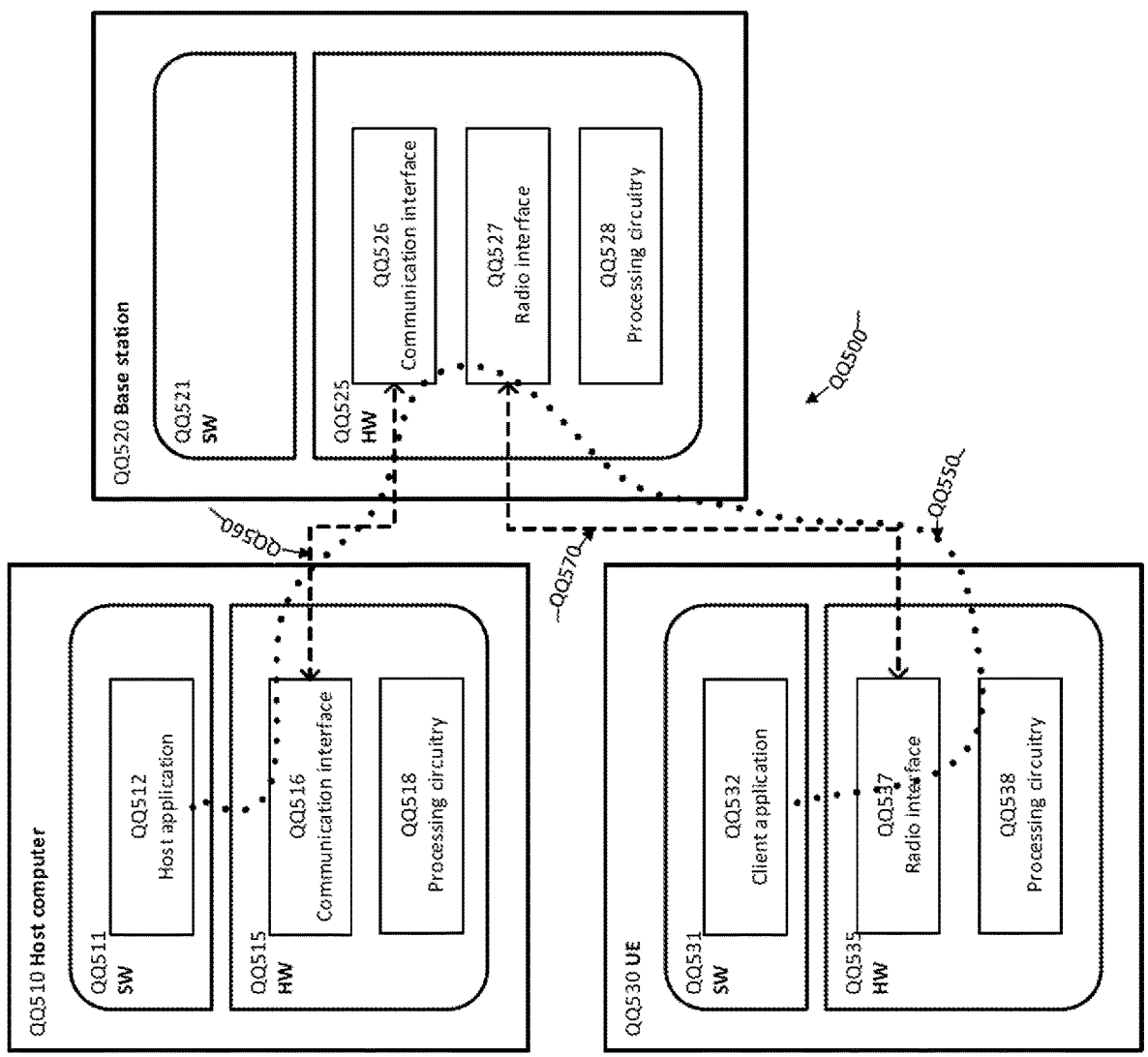
FIG. 11 illustrates a schematic block diagram of a host computer communicating via a base station with a user equipment over a partially wireless connection, according to an embodiment.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
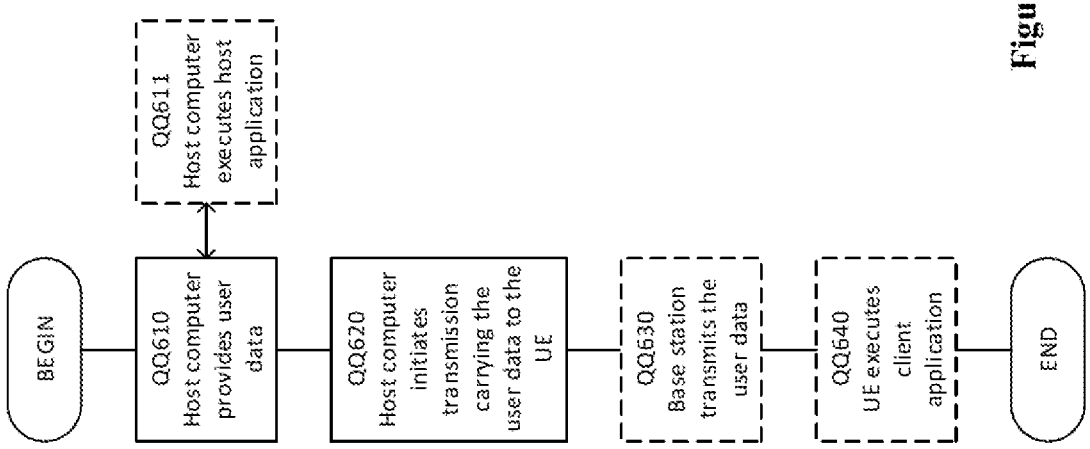
FIG. 12 is a flowchart illustrating a method implemented in a communication system including a host computer, a base station and a user equipment, according to an embodiment

FIG. 12 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
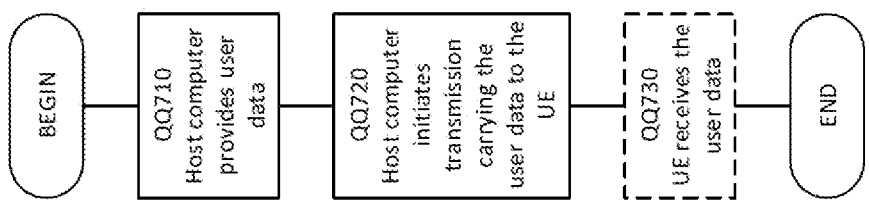
FIG. 13 is a flowchart illustrating a method implemented in a communication system including a host computer, a base station and a user equipment according to an embodiment.

FIG. 13 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 14, 15:
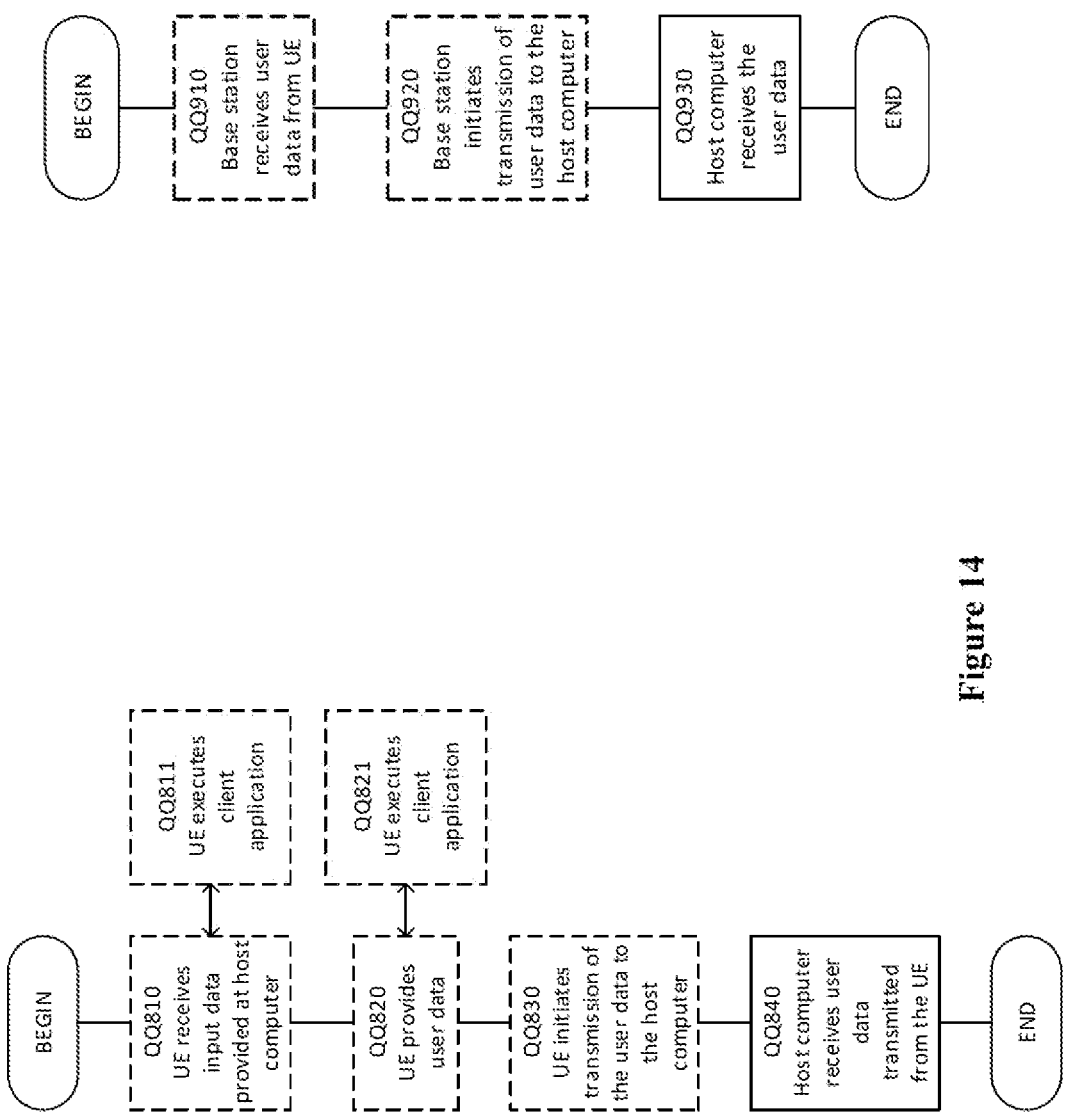
FIG. 14 is a flowchart illustrating a method implemented in a communication system including a host computer, a base station and a user equipment, according to an embodiment.
FIG. 15 is a flowchart illustrating a method implemented in a communication system including a host computer, a base station and a user equipment, according to an embodiment.

FIG. 14 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 16:
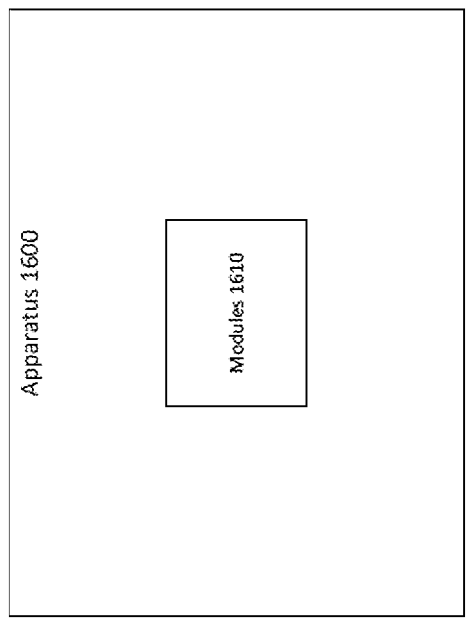
FIG. 16 is a schematic diagram of a virtual apparatus implemented in a wireless device or network node, according to an embodiment.

FIG. 16 illustrates a schematic block diagram of a virtual apparatus 1600 in a wireless network (for example, the wireless network shown in FIG. 7). The apparatus 1600 may be implemented in a wireless device or network node (e.g., wireless device QQ110 or network node QQ160 shown in FIG. 7). Apparatus 1600 is operable to carry out the example method described with reference to FIG. 5 or 6 and possibly any other processes or methods disclosed herein. It is also to be understood that the method of FIG. 5 or 6 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause any modules 1610 of apparatus 1600 to perform corresponding functions according one or more embodiments of the present disclosure.

As illustrated in FIG. 16, apparatus 1600 includes modules 1610 such as an obtaining module, a determining module, a selecting module and a transmitting module. The obtaining module is configured to perform at least step 510 of method 500 in FIG. 5 or step 610 of method 600 of FIG. 6. The determining is configured to perform at least step 520 of method 500 in FIG. 5 or step 620 of method 600 of FIG. 6. The selecting module is configured to perform at least step 530 of method 500 in FIG. 5 or step 630 of method 600 of FIG. 6. The transmitting module is configured to perform at least step 540 of method 500 in FIG. 5 or step 640 of method 600 of FIG. 6.

The above-described embodiments are intended to be examples only. Alterations, modifications and variations may be effected to the particular embodiments by those of skill in the art without departing from the scope of the description, which is defined solely by the appended claims.

What is claimed is:

1. A method in a wireless device for transmitting data on sidelink carriers, the method comprising:
   determining a Congestion Busy Ratio (CBR) of a sidelink carrier; and
   in response to determining that the CBR is below a first threshold, selecting the sidelink carrier for data transmission and starting transmitting data on the selected sidelink carrier;
   in response to determining that the CBR is below a second threshold, keeping transmitting on the selected sidelink carrier,
   wherein selecting the sidelink carrier comprises adding the sidelink carrier to a number of currently used carriers by the wireless device, and
   wherein the first threshold is distinct from the second threshold.

2. The method of claim 1, further comprising, determining the CBR of the sidelink carrier another time and in response to determining that the determined CBR is above the second threshold, stopping data transmission on the selected sidelink carrier.

3. The method of claim 1, wherein the first threshold comprises a maximum level of congestion that the wireless device can experience before being allowed to start a new sidelink carrier.

4. The method of claim 1, wherein the second threshold comprises a maximum level of congestion that the wireless device can experience before stopping using a sidelink carrier.

5. The method of claim 1, further comprising, determining the CBR of the sidelink carrier another time and in response to determining that the CBR is below the second threshold but above the first threshold, keeping transmitting on the selected sidelink carrier but preventing the wireless device to select a sidelink carrier to start using it.

6. The method of claim 1, wherein the first and second thresholds are associated with a traffic priority identifier.

7. The method of claim 1, wherein the CBR is weighted by a weight factor.

8. The method of claim 7, wherein the weighted CBR represents a probability to select a sidelink carrier.

9. The method of claim 7, wherein the weight factor is associated with a traffic priority identifier.

10. A wireless device comprising a communication interface and processing circuitry connected thereto, the processing circuitry comprising a processor and a memory connected thereto, the memory containing instructions that, when executed, cause the processor to:
    determining a Congestion Busy Ratio (CBR) of a sidelink carrier; and
    in response to determining that the CBR is below a first threshold, selecting the sidelink carrier for data transmission and starting transmitting data on the selected sidelink carrier;
    in response to determining that the CBR is below a second threshold, keeping transmitting on the selected sidelink carrier,
    wherein selecting the sidelink carrier comprises adding the sidelink carrier to a number of currently used carriers by the wireless device, and
    wherein the first threshold is distinct from the second threshold.

11. The wireless device of claim 10, wherein the processor is configured to determine the CBR of the sidelink carrier another time and in response to determining that the determined CBR is above the second threshold, stop data transmission on the selected sidelink carrier.

12. The wireless device of claim 10, wherein the first threshold comprises a maximum level of congestion that the wireless device can experience before being allowed to start a new sidelink carrier.

13. The wireless device of claim 10, wherein the second threshold comprises a maximum level of congestion that the wireless device can experience before stopping using a sidelink carrier.

14. The wireless device of claim 10, wherein the processor is configured to determine the CBR of the sidelink carrier another time and in response to determining that the CBR is below the second threshold but above the first threshold, keep transmitting on the selected sidelink carrier but prevent the wireless device to select a sidelink carrier to start using it.

15. The wireless device of claim 10, wherein the first and second thresholds are associated with a traffic priority identifier.

16. The wireless device of claim 10, wherein the CBR is weighted by a weight factor.

17. The wireless device of claim 16, wherein the weighted CBR represents a probability to select a sidelink carrier.

18. The wireless device of claim 16, wherein the weight factor is associated with a traffic priority identifier.

* * * * *